US011635901B2

United States Patent
Yang

(10) Patent No.: US 11,635,901 B2
(45) Date of Patent: Apr. 25, 2023

(54) DATA STORAGE DEVICE, AND NON-VOLATILE MEMORY CONTROL METHOD

(71) Applicant: Shannon Systems Ltd., Shanghai (CN)

(72) Inventor: Xueshi Yang, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 185 days.

(21) Appl. No.: 17/111,975

(22) Filed: Dec. 4, 2020

(65) Prior Publication Data
US 2021/0208800 A1 Jul. 8, 2021

(30) Foreign Application Priority Data
Jan. 6, 2020 (CN) .......................... 202010010115.4

(51) Int. Cl.
*G06F 3/06* (2006.01)

(52) U.S. Cl.
CPC .......... *G06F 3/0631* (2013.01); *G06F 3/0604* (2013.01); *G06F 3/0685* (2013.01); *G06F 3/0629* (2013.01); *G06F 3/0644* (2013.01); *G06F 3/0658* (2013.01); *G06F 3/0679* (2013.01); *G06F 3/0689* (2013.01)

(58) Field of Classification Search
CPC .... G06F 3/0631; G06F 3/0604; G06F 3/0685; G06F 3/0689; G06F 3/0644; G06F 3/0629; G06F 3/0658; G06F 3/0679
See application file for complete search history.

(56) References Cited

U.S. PATENT DOCUMENTS

| | | | |
|---|---|---|---|
| 8,996,837 B1 | 3/2015 | Bono et al. | |
| 2011/0246716 A1* | 10/2011 | Frame | G06F 3/0631 |
| | | | 711/E12.001 |
| 2019/0012097 A1* | 1/2019 | Chen | G11C 8/12 |
| 2019/0227718 A1* | 7/2019 | Frolikov | G06F 12/0646 |
| 2021/0191850 A1* | 6/2021 | Subbarao | G06F 3/0679 |

FOREIGN PATENT DOCUMENTS

| | | |
|---|---|---|
| CN | 102469461 A | 5/2012 |
| CN | 102541468 A | 7/2012 |

* cited by examiner

*Primary Examiner* — Masud K Khan
(74) *Attorney, Agent, or Firm* — McClure, Qualey & Rodack, LLP

(57) ABSTRACT

Space allocation for non-volatile memory is shown. A controller establish a first namespace set by allocating the non-volatile memory in units of a first storage unit, and establishes a second namespace set by allocating the non-volatile memory in units of a second storage unit. The first storage unit is bigger than or equal to the second storage unit, and the first storage unit has better input and output isolation than the second storage unit. The first namespace set and the second namespace set are in the different tiers in a hierarchical storage architecture.

20 Claims, 13 Drawing Sheets

DATA STORAGE DEVICE, AND NON-VOLATILE MEMORY CONTROL METHOD

CROSS REFERENCE TO RELATED APPLICATIONS

This Application claims the priority of China Patent Applications No. 202010010115.4, filed on Jan. 6, 2020, the entirety of which is incorporated by reference herein.

BACKGROUND OF THE INVENTION

Field of the Invention

The present invention is related to data storage space allocation.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

As the storage capacity of non-volatile memories increases, the same data storage device may be shared for multiple purposes. However, data access for different purposes may interfere with each other.

BRIEF SUMMARY OF THE INVENTION

Data Storage space allocation for non-volatile memory is proposed.

A data storage device in accordance with an exemplary embodiment of the present invention includes a non-volatile memory and a controller. The controller is coupled to the non-volatile memory and configured to control the non-volatile memory. The controller establishes a first namespace set by allocating the non-volatile memory in units of a first storage unit, and establishes a second namespace set by allocating the non-volatile memory in units of a second storage unit. The first storage unit is bigger than or equal to the second storage unit, and the first storage unit has better input and output isolation than the second storage unit. The first namespace set is in a first tier in a hierarchical storage architecture, and the second namespace set is in a second tier in the hierarchical storage architecture.

In an exemplary embodiment, the controller further establishes a third namespace set by allocating the non-volatile memory in units of the first storage unit without overlapping the first namespace set. The controller establishes the second namespace set within the first namespace set. Within the first namespace set, the controller establishes a fourth namespace set by allocating the non-volatile memory in units of the second storage unit without overlapping the second namespace set.

In an exemplary embodiment, the controller permits a first application program run for the first namespace set to access the second namespace set and the fourth namespace set. The controller forbids the first application program to access the third namespace set. The controller may further forbid a second application program run for the second namespace set to access the fourth namespace set.

In an exemplary embodiment, within the second namespace set, the controller further establishes a fifth namespace set and a sixth namespace by allocating the non-volatile memory in units of the second storage unit. The established fifth namespace set and a sixth namespace set are in a third tier in the hierarchical storage architecture. The fifth namespace set does not overlap the sixth namespace set. The controller may permit the second application program to access the fifth namespace set and the sixth namespace set.

In an exemplary embodiment, the non-volatile memory is a flash memory. The controller accesses the flash memory though a plurality of channels and controls a plurality of chip-enable signals to alternately enable rows of storage areas for parallel access through the plurality of channels. Storage areas accessed through the same channel but enabled by the different chip-enable signals are distinguished from each other by logical unit numbers. Each logical unit number manages a plurality of blocks. Each storage area managed by a logical unit number is a first storage unit. Each block is a second storage unit.

In an exemplary embodiment, the first namespace set and the third namespace set are accessed through the different channels. Each storage area managed by logical unit numbers assigned to the first namespace set may be partially assigned to the second namespace set and partially assigned to the fourth namespace set.

In an exemplary embodiment, the first namespace set and the third namespace set are controlled by the different chip-enable signals. Each storage area managed by logical unit numbers assigned to the first namespace set may be partially assigned to the second namespace set and partially assigned to the fourth namespace set.

The forgoing controller may be implemented in other structures. Based on the forgoing control concept, a non-volatile memory control method may be proposed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called an eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

As storage capacity increases, one flash memory may be shared for multiple purposes. For example, several users may share the same flash memory, or several applications may share the same flash memory. Data access requested by the different users/applications may interfere with each other. For example, if an application frequently writes data into the flash memory, another application that frequently reads the flash memory may be significantly delayed. The data storage space allocation of flash memory needs to consider the interference problem between different users/applications.

In an exemplary embodiment, the data storage space allocation of flash memory is based on input and output (I/O) isolation. Taking cloud computing or virtual reality technology as an example, a shared data storage device should provide I/O isolated storage areas for the different uses, to ensure the Quality of Service (QoS), or meet the Service Level Agreement (SLA).

Figure 1:
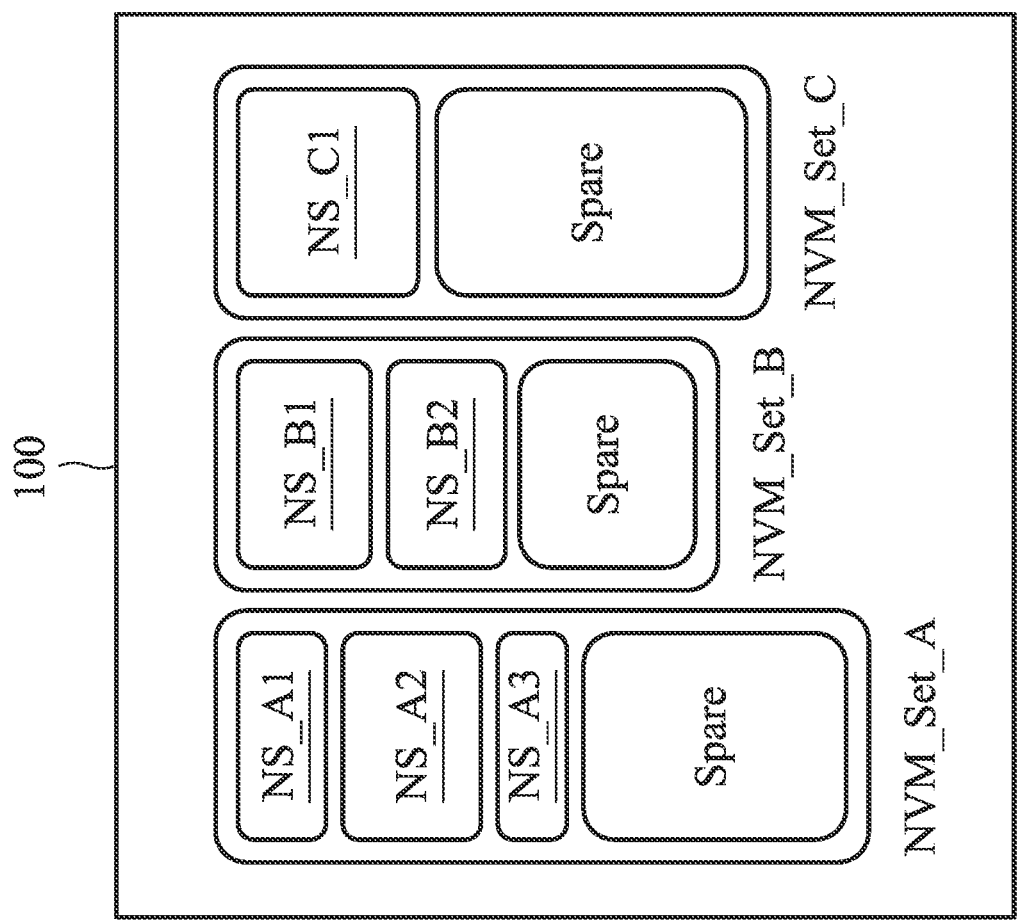
FIG. 1 illustrates data storage space allocation in accordance with an exemplary embodiment of the present invention, which divides the data storage space into namespace sets for I/O determination.

FIG. 1 illustrates data storage space allocation in accordance with an exemplary embodiment of the present invention, which divides the data storage space into namespace sets for I/O determination.

The data storage device 100 of in FIG. 1 communicates with a host through an NVMe (Non-Volatile Memory Express) interface. A flash memory is divided into three namespace sets NVM_Set_A, NVM_Set_B, and NVM_Set_C. The namespace set NVM_Set_A includes three namespaces NS_A1, NS_A2, and NS_A3. The namespace set NVM_Set_B includes two namespaces NS_B1 and NS_B2. The namespace set NVM_Set_C includes one namespace NS_C1. Each namespace can be formatted and encrypted individually. Each namespace set can include one or more namespaces. The namespace sets NVM_Set_A, NVM_Set_B and NVM_Set_C are I/O isolated from each other, so that the different operating systems, file systems, and/or applications at the host side are isolated from each other with reduced flash memory access interference. For example, two different operating systems may use the different namespace sets NVM_Set_A and NVM_Set_B, so that the two different operating systems are isolated from each other.

In an exemplary embodiment, the isolation demand is not fixed. The present invention proposes tiered namespace sets for the different isolation demands. For example, by the tiered namespace set allocation, the namespace sets NVM_Set_A and NVM_Set_B can be more perfectly isolated from each other.

Figure 2:
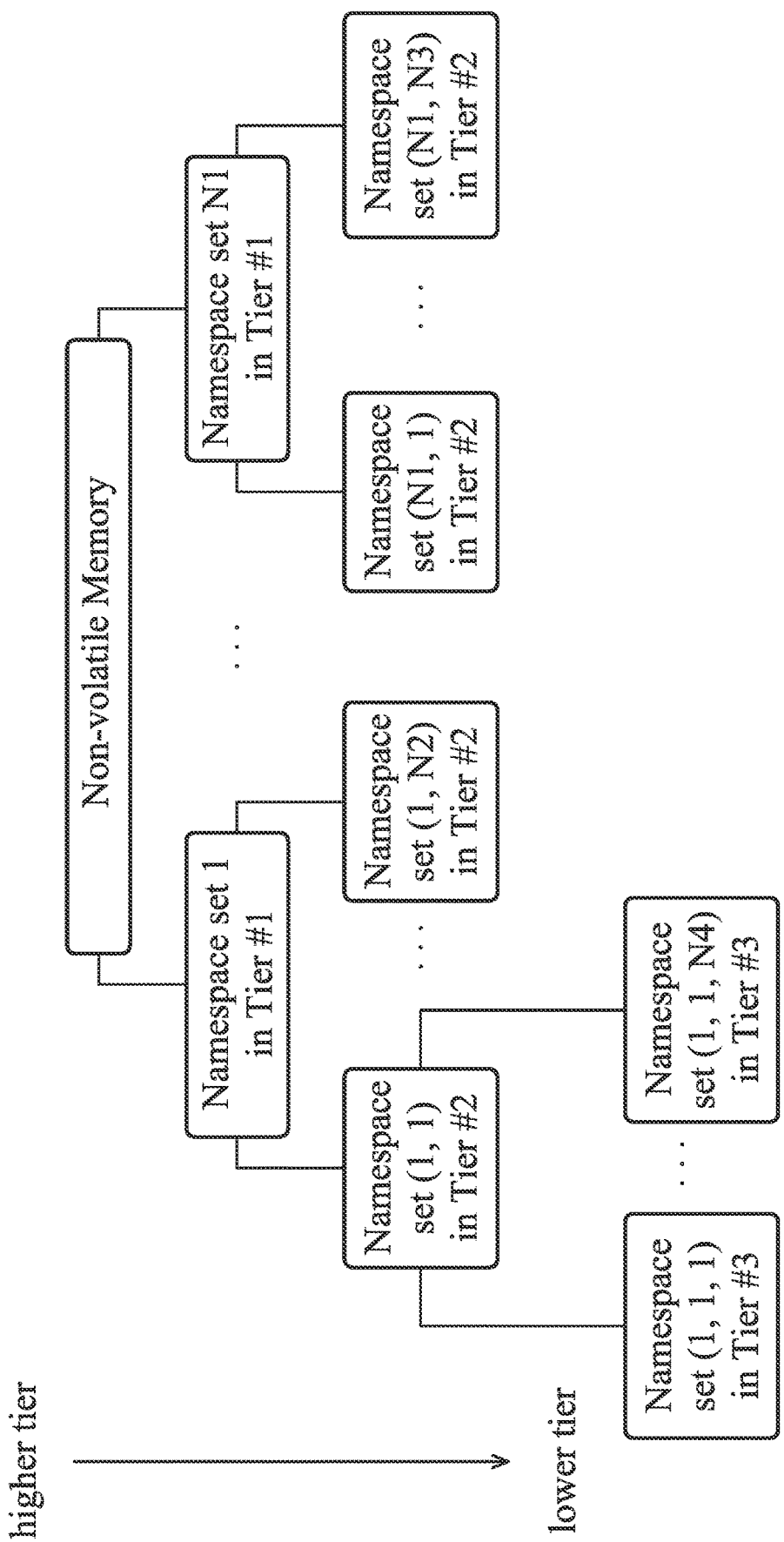
FIG. 2 illustrates a hierarchical storage architecture formed by tiered namespace sets.

FIG. 2 illustrates a hierarchical storage architecture formed by tiered namespace sets. A higher-tiered namespace set may be divided into several lower-tiered namespace sets. The namespace sets in the higher tier correspond to the more ideal I/O isolation.

In an exemplary embodiment, the data storage space allocation starts from the highest tier (tier #1). The namespace sets 1 to N1 in tier #1 can be regarded as mother sets to be further divided into sub sets which are classified to the lower tier. As shown, the namespace set 1 in tier #1 is further divided into N2 namespace sets (1, 1) to (1, N2) which are classified to tier #2, and the namespace set N1 in tier #1 is further divided into N3 namespace sets (N1, 1) to (N1, N3) which are classified to tier #2. Similarly, the namespace sets in tier #2 can be further divided into lower tiered namespace sets. For example, the namespace set (1, 1) in tier #2 is further divided into N4 namespace sets (1, 1, 1) to (1, 1, N4) which are classified to tier #3. The tree diagram can continue to branch to establish a lower-tiered namespace set.

In another exemplary embodiment, a hybrid set is proposed. Sub sets (no matter they are divided from the same mother set or the different mother sets) can be combined together to form a hybrid set. For example, the namespace set (N1, 1) in tier #2 may be combined with the namespace set (1, 1) in tier #2 to form a hybrid set, the namespace set (N1, N3) in tier #2 may be combined with the namespace set (1, N2) in tier #2 to form a hybrid set, the namespace set (N1, 1) in tier #2 may be combined with the namespace set (1, 1, 1) in tier #3 to form a hybrid set, and the namespace set (N1, N3) in tier #2 may be combined with the namespace set (1, 1, N4) in tier #3 to form a hybrid set. In this way, the establishment of namespace sets can have more flexibility.

Corresponds to such a hierarchical storage architecture, the software and hardware may be also in a hierarchical architecture. In an exemplary embodiment, the software and hardware resources assigned to a mother set are shared by the sub sets divided from the mother set.

In an exemplary embodiment, the application programs installed to correspond to a mother set can access the sub sets divided from the mother set. For example, an application program run for the namespace set 1 (in tier #1) is allowed to access the namespace sets (1, 1) to (1, N2) in tier #2 but is not allowed to access the storage space in the other branches, such as another namespace set N1 in tier #1 that includes the namespace sets (N1, 1) to (N1, N3) in tier #2. In another example, an application program run for the namespace set (1, 1) in tier #2 is allowed to access the namespace sets (1, 1, 1) to (1, 1, N4) in tier #2, but is not allowed to access the storage space in the other branches such as another namespace set (1, N2) in tier #2.

Specifically, the I/O isolation between the sub sets derived from the same mother set is lower than the I/O isolation between the sub sets derived from the different mother sets. For example, the I/O isolation between the namespace sets (1, 1) to (1, N2) in tier #2 is lower than the I/O isolation between the namespace sets (1, 1) and (N1, 1).

The data storage space allocation for the higher tier is different from that for the lower tier. In an exemplary embodiment, the higher-tiered namespace set is established by allocating the non-volatile memory in units of a first storage unit, and the lower-tiered namespace set is established by allocating the non-volatile memory in units of a second storage unit, wherein the first storage unit is bigger than or equal to the second storage unit, and the first storage unit has better I/O isolation than the second storage unit. The selection of the first unit and the second unit depend on the storage characteristics of the non-volatile memory.

Figure 3:
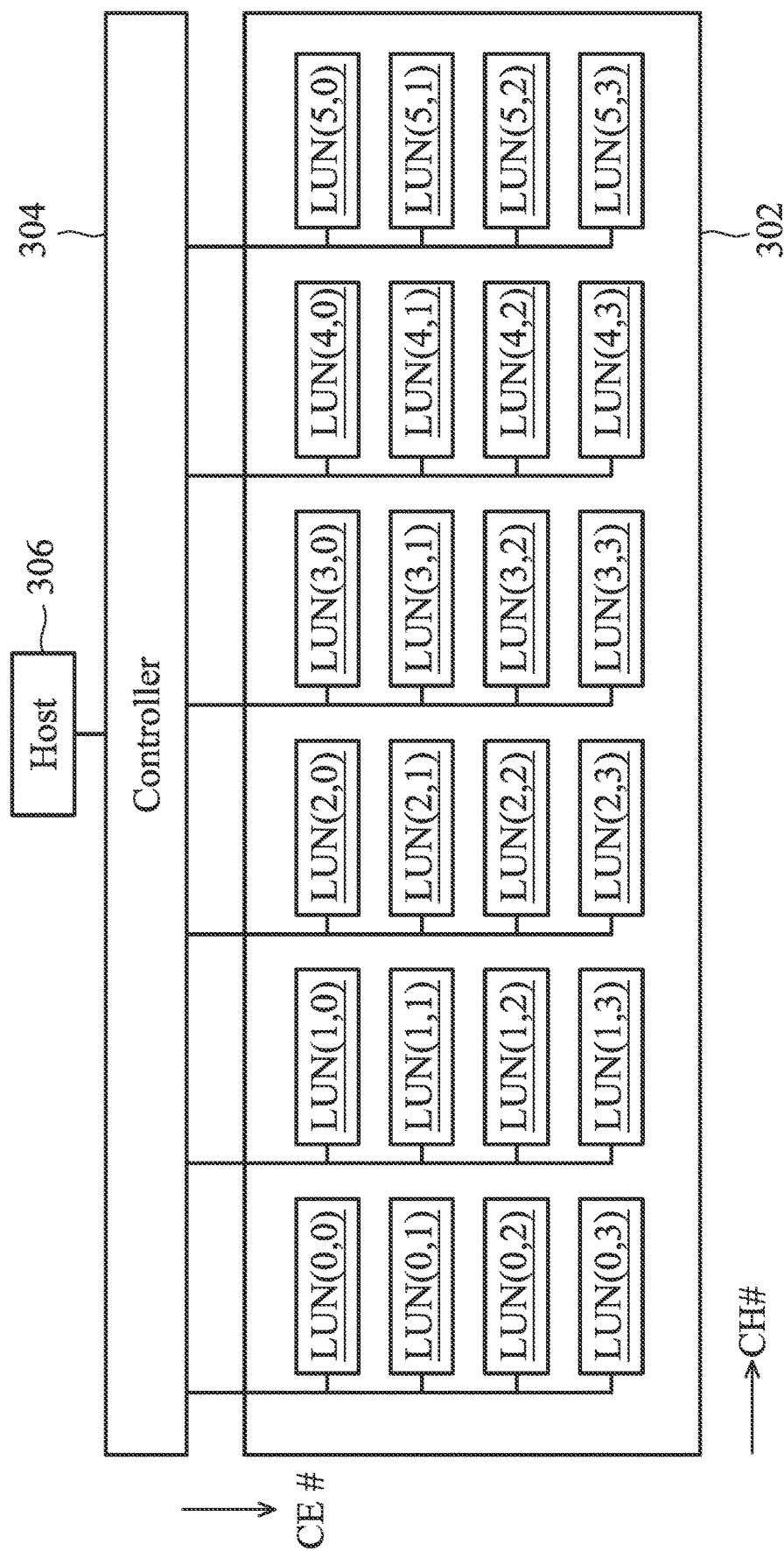
FIG. 3 illustrates a data storage device 100 in accordance with an exemplary embodiment of the present invention, which includes a flash memory 302 and a controller 304.

FIG. 3 illustrates a data storage device 100 in accordance with an exemplary embodiment of the present invention, which includes a flash memory 302 and a controller 304. A host 306 operates the controller 304 to access the flash memory 302 through a plurality of channels. Specifically, rows of storage areas are enabled alternately by a plurality of chip-enable signals for parallel access through the plurality of channels. Storage areas accessed through the same channel but enabled by the different chip-enable signals are distinguished from each other by logical unit numbers (LUNs). FIG. 3 shows six channels (CH #) and four chip-enable signals (CE #), and 24 logical unit numbers LUN(CH #, CE #) are required. The storage area indicated by one logical unit number includes a plurality of blocks, each block includes a plurality of pages, and each page includes a plurality of sectors. In the flash memory 302, data erasure is performed in units of blocks. The controller 304 cannot individually erase any space smaller than one block. In an exemplary embodiment of the present invention, the controller 304 performs tier #1 namespace set allocation in units of LUNs (LUN-based), and performs tier #2 namespace set allocation in units of blocks (block-based). The I/O isolation between the namespace sets in tier #1 is higher than the I/O isolation between the namespace sets in tier #2. Compared with blocks, the I/O isolation between the different LUNs is better. Two different space areas managed by two different LUNs can be accessed independently without interfering each other. In an exemplary embodiment, the namespace set allocation for the lower tier (lower I/O isolation) is performed based on the block-based concept, too.

Figure 4A:
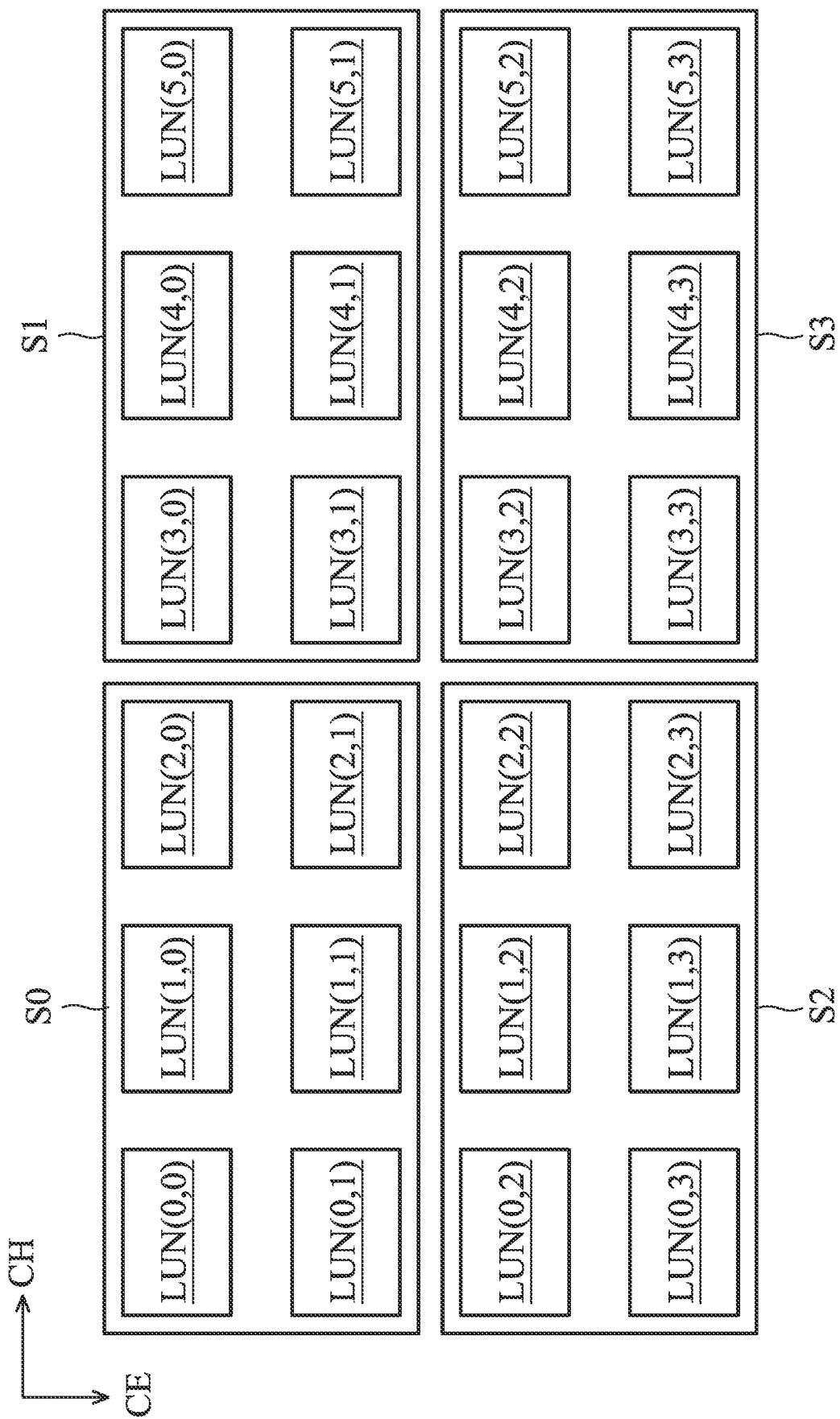
FIG. 4A illustrates LUN-based namespace set allocation in accordance with an exemplary embodiment of the present invention, wherein this allocation results in namespace sets each accessed through multiple channels and controlled by multiple chip-enable signals.

FIG. 4A illustrates LUN-based namespace set allocation in accordance with an exemplary embodiment of the present invention. This allocation results in namespace sets each accessed through multiple channels and controlled by multiple chip-enable signals. As shown, four namespace sets S0 to S3 are established for the 6 CH and 4 CE case. Each namespace set are accessed through three channels and are controlled by two chip-enable signals.

Figure 4B:
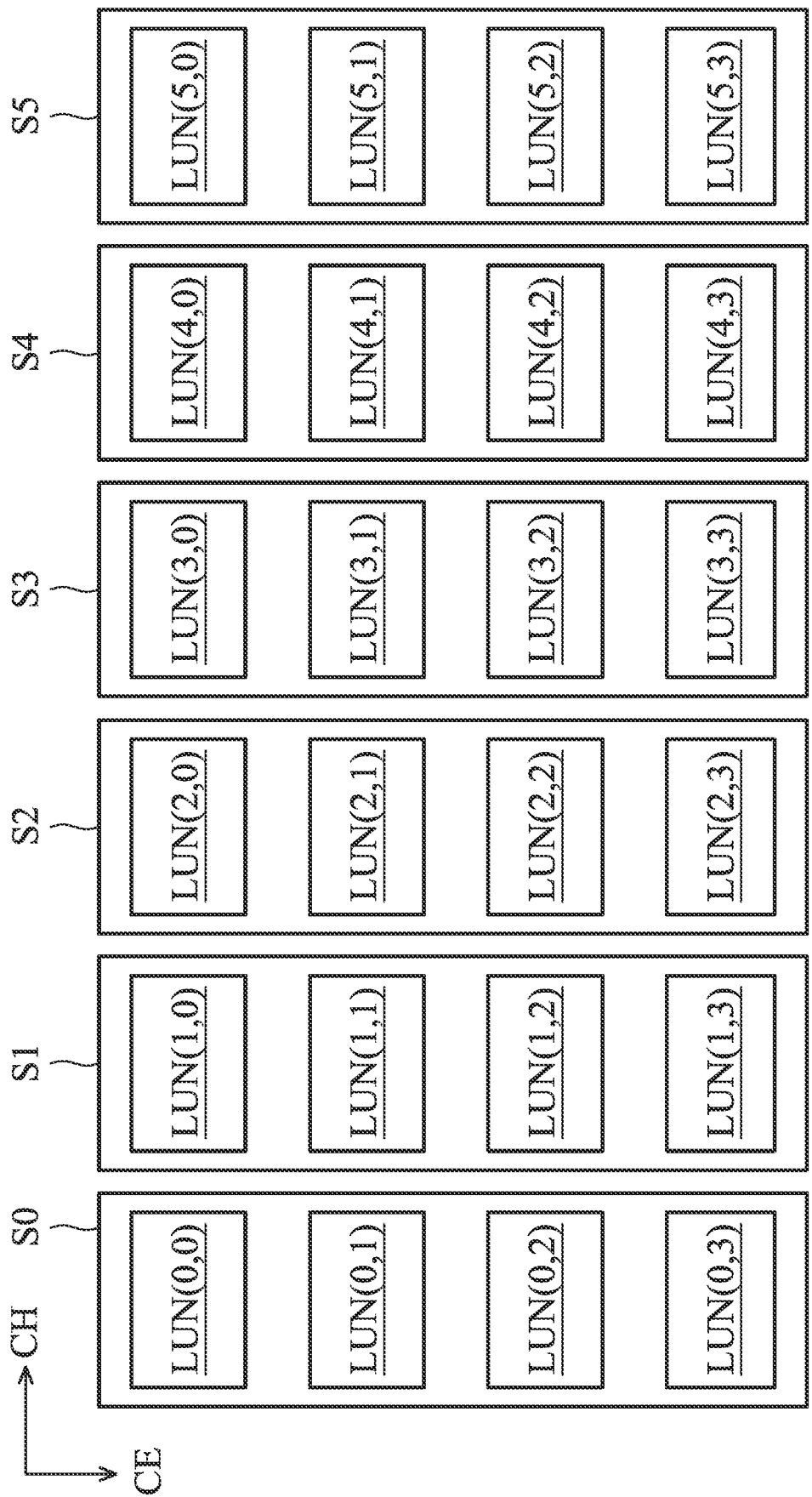
FIG. 4B illustrates LUN-based namespace set allocation in accordance with another exemplary embodiment of the present invention, wherein this allocation results in namespace sets each accessed through just one single channel and controlled by multiple chip-enable signals.

FIG. 4B illustrates LUN-based namespace set allocation in accordance with another exemplary embodiment of the present invention. This allocation results in namespace sets each accessed through just one single channel and controlled by multiple chip-enable signals. As shown, six namespace sets S0 to S5 are established for the 6 CH and 4 CE case. The five namespace sets S0 to S5 are accessed in parallel through the five channels.

Figure 4C:
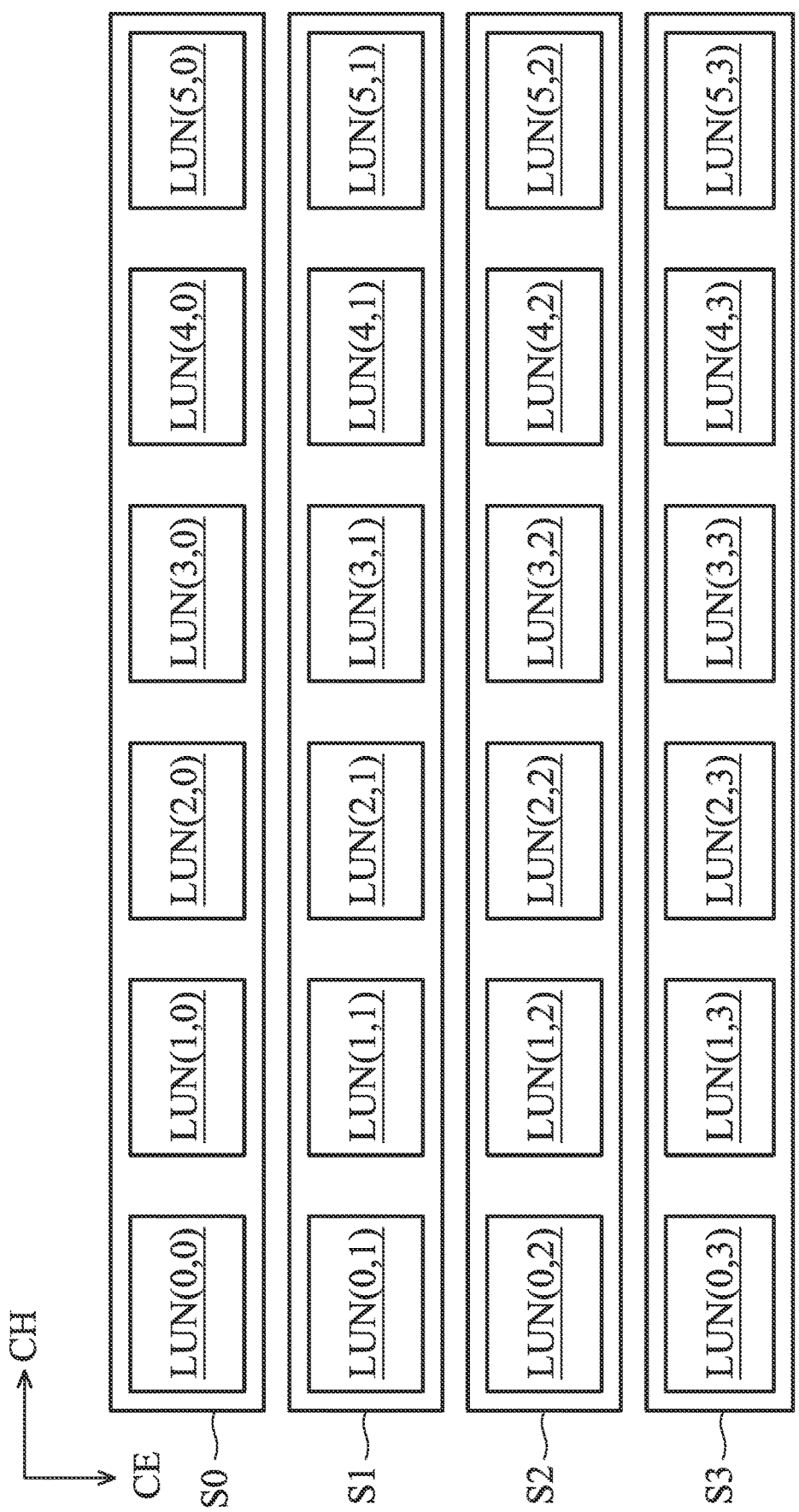
FIG. 4C illustrates LUN-based namespace set allocation in accordance with another exemplary embodiment of the present invention, wherein this allocation results namespace sets each accessed through multiple channels and controlled by just one single chip-enable signal.

FIG. 4C illustrates LUN-based namespace set allocation in accordance with another exemplary embodiment of the present invention. This allocation results namespace sets each accessed through multiple channels and controlled by just one single chip-enable signal. As shown, four namespace sets S0 to S3 are established for the 6 CH and 4 CE case. The four namespace sets S0 to S3 are enabled alternately by the four chip enables signals for the parallel access through the six channels.

It is not intended to limit the LUN-based namespace set allocation to establishing namespace sets each accessed through multiple channels and/or controlled by multiple chip-enable signals. Any technology that makes the storage cells of the same LUN being the same namespace set can be understood as the LUN-based namespace set allocation.

There are many advantages to the LUN-based namespace set allocation. The different namespace sets are independent and can be regarded as completely separated in physical space, which can indeed meet the service-level agreement (SLA). Media collision is effectively reduced.

The LUN-based namespace set allocation is also convenient to implement a redundant array of independent hard disks (RAID) system. The backup content will be stored in a storage space managed by the specific LUNs.

A mother set established by the LUN-based namespace set allocation may be further divided into block-based sub sets.

Figure 5A:
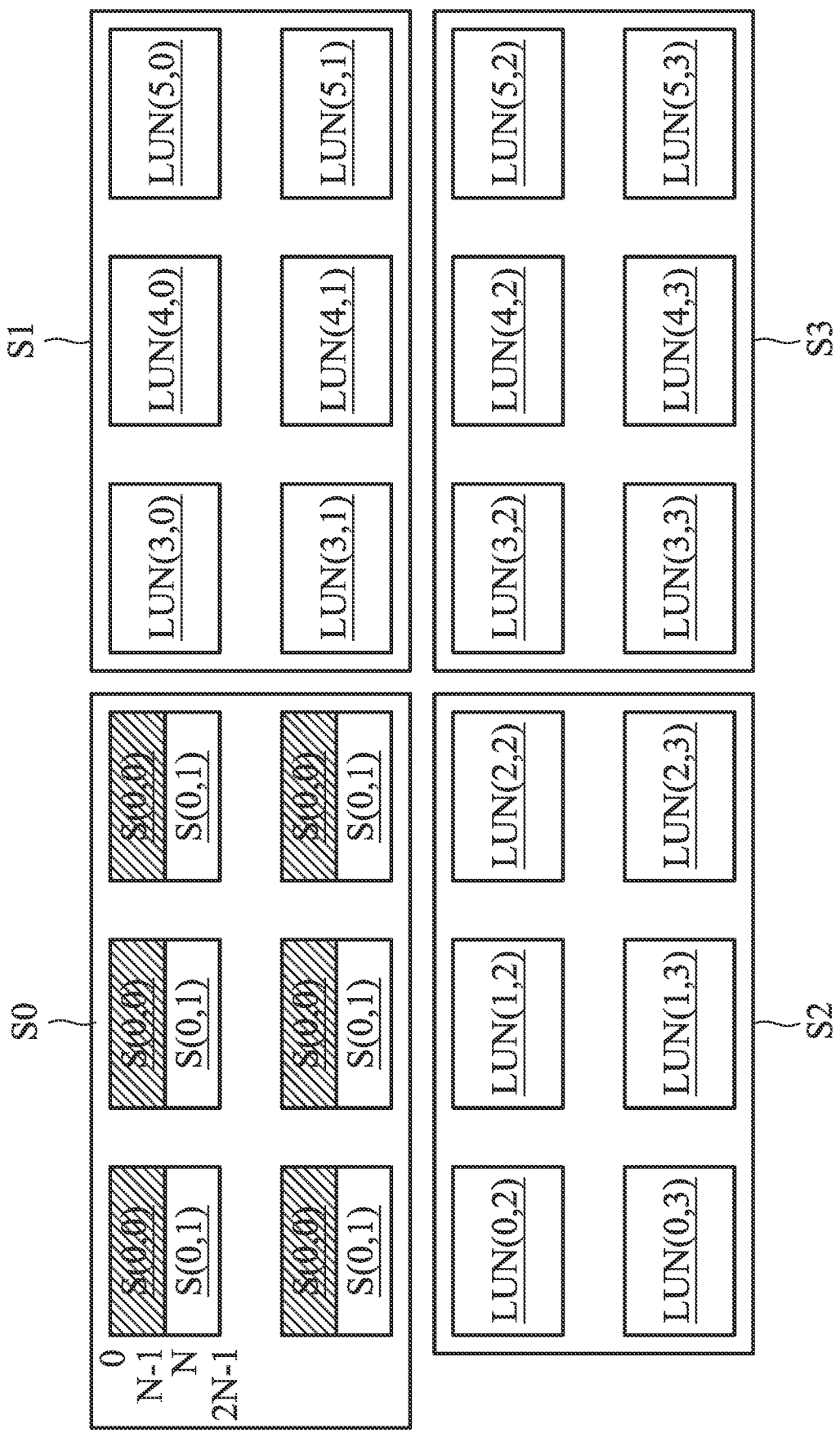
FIGS. 5A-5C illustrate block-based namespace set allocation in accordance with several exemplary embodiments of the present invention.

FIG. 5A illustrates block-based namespace set allocation in accordance with an exemplary embodiment of the present invention. The namespace set S0 of FIG. 4A is allocated by LUN-based namespace set allocation and can be further divided into two namespace sets by block-based namespace set allocation, including a namespace set S(0, 0) (marked by slashes), and a namespace set S(0,1) (without slashes). The two namespace sets S(0,0) and S(0,1) each spans multiple LUNs. Referring to the LUNs related to the namespace set S0, the first half blocks (block number 0 to N−1) form the namespace set S(0,0), and the second half blocks (block number N to 2N−1) form the namespace set S(0,1).

Figure 5B:
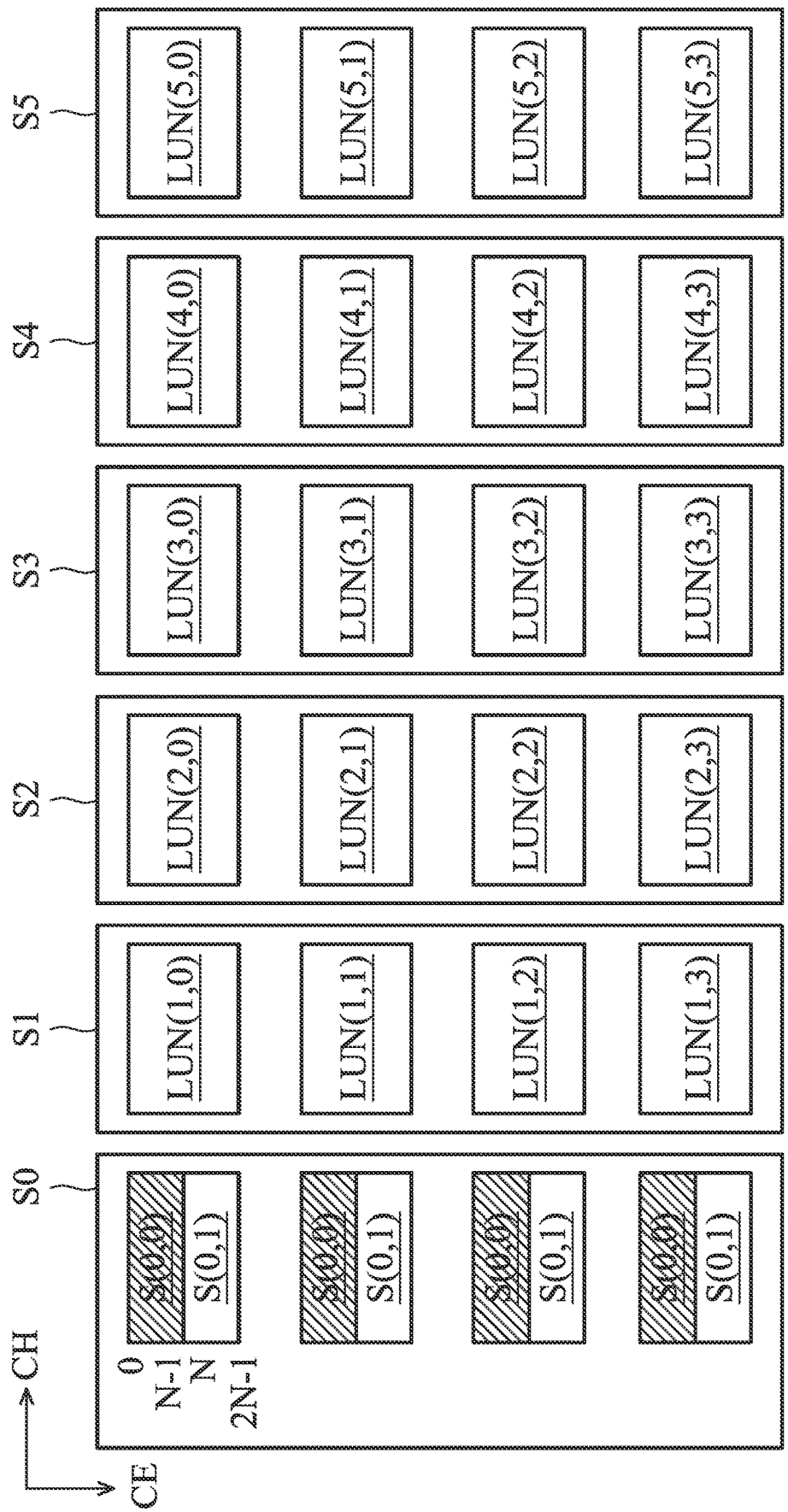
Figure 5C:
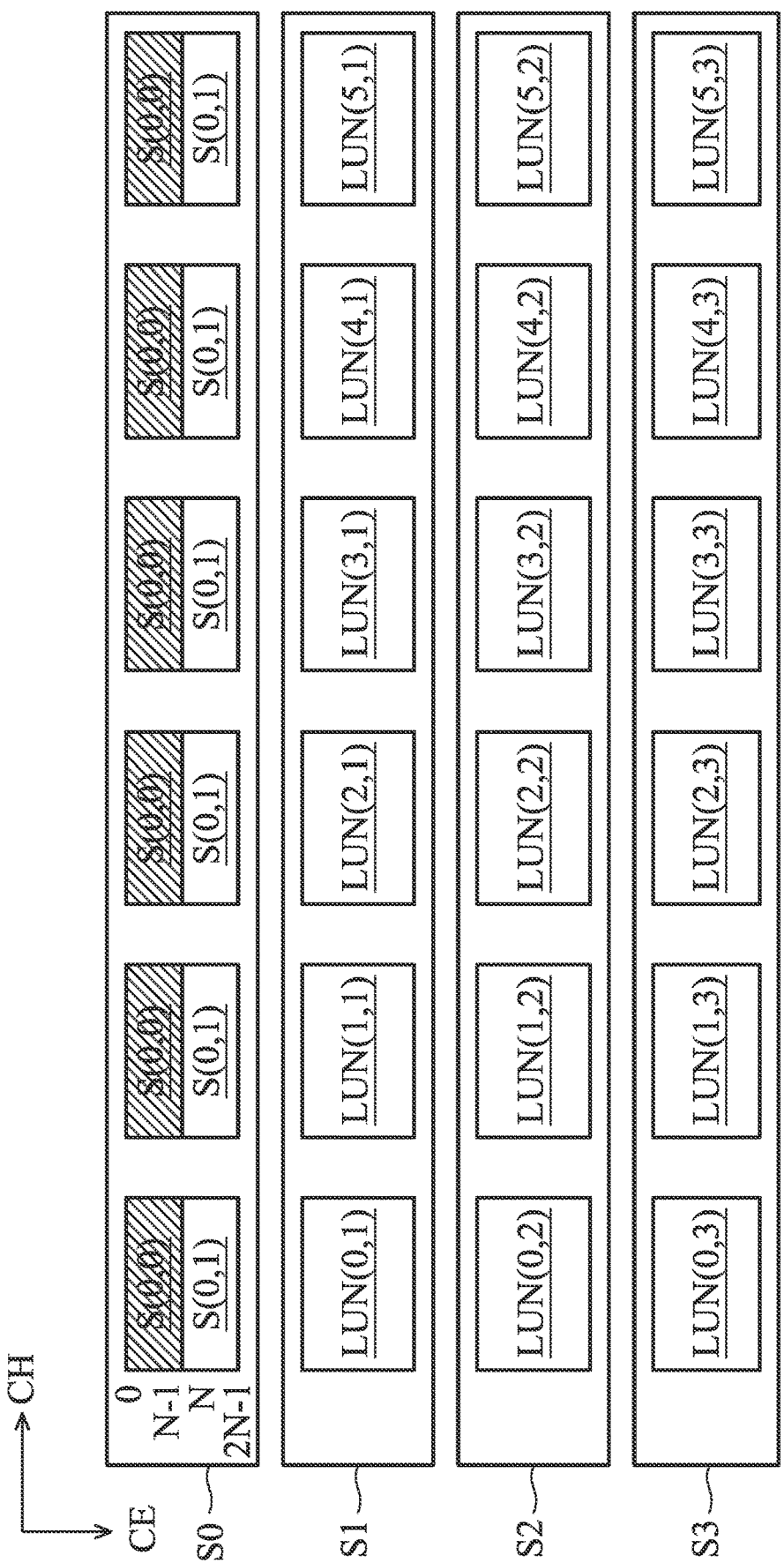

Similarly, the LUN-based namespace sets of FIG. 4B and FIG. 4C can be further divided in units of blocks (i.e., block-based namespace set allocation) as shown in FIG. 5B and FIG. 5C. The LUN-based namespace set S0 can be further divided into two namespace sets by block-based namespace set allocation, including a namespace set S(0, 0) (marked by slashes), and a namespace set S(0,1) (without slashes). The two namespace sets S(0,0) and S(0,1) each spans multiple LUNs. Referring to the LUNs related to the namespace set S0, the first half blocks (block number 0 to N-1) form the namespace set S(0,0), and the second half blocks (block number N to 2N-1) form the namespace set S(0,1).

It is not intended to limit the block-based namespace set allocation to establishing namespace sets each spans multiple LUNs. Any technology that makes the storage cells of the same block being the same namespace set can be understood as the block-based namespace set allocation.

Block-based namespace set allocation has many advantages. For example, it is not limited to the total number of LUNs. Compared to the LUN-based namespace set allocation, more namespace sets can be established in units of blocks, and the block-based namespace set allocation is more flexible.

Figure 6:
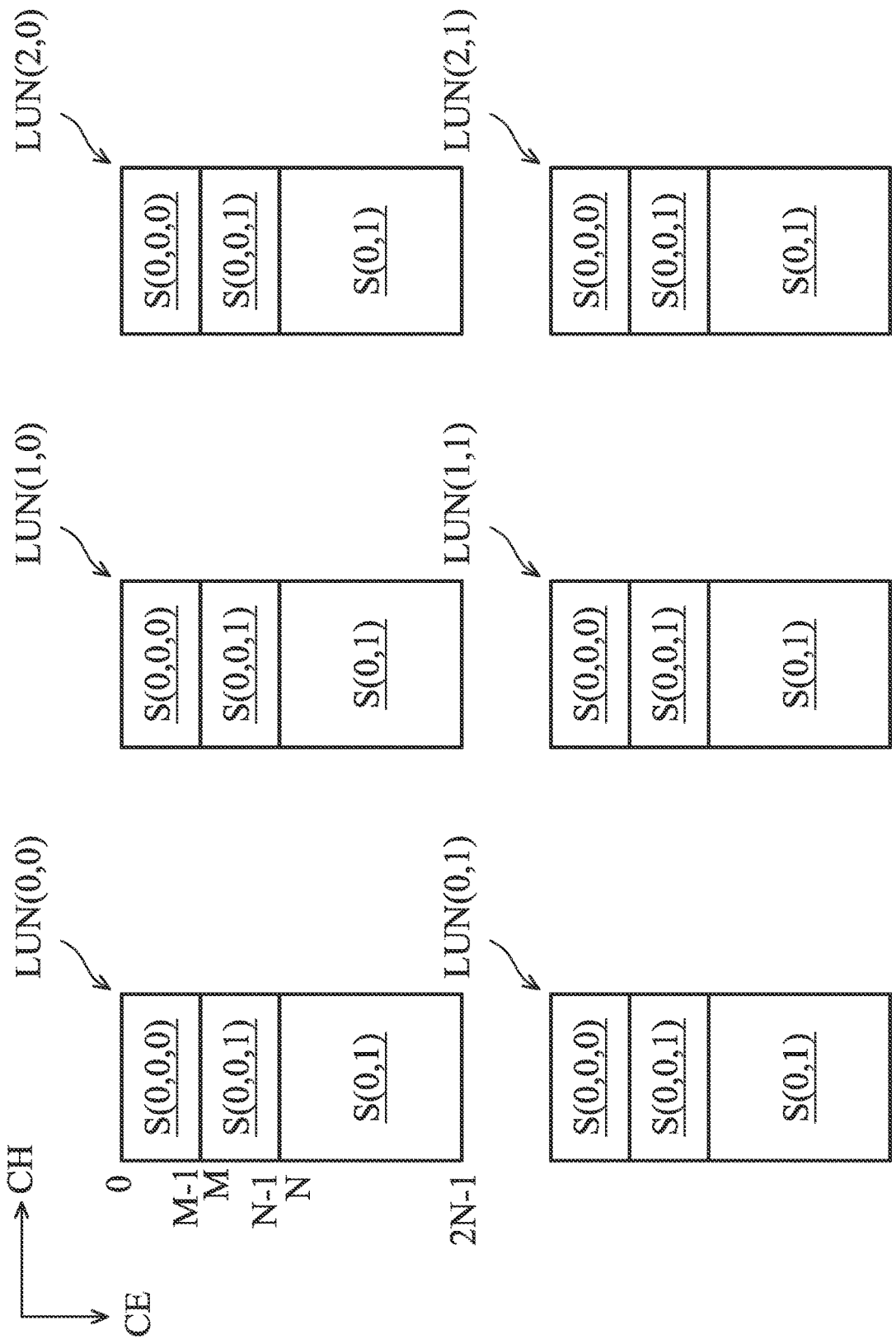
FIG. 6 illustrates sub sets S(0, 0, 0) and S(0, 0, 1) which are established by dividing a mother set S(0, 0) of FIG. 5A by block-based namespace set allocation.

The block-based namespace set allocation can be performed to establish the lower-level namespace sets. For example, the namespace set S(0, 0) of FIG. 5A can be regarded as a mother set and divided into sub sets S(0, 0, 0) and S(0, 0, 1) in units of blocks as shown in FIG. 6. In each LUN related to the namespace set S(0, 0), the blocks from block number 0 to (M-1) are allocated to form the namespace set S(0, 0, 0), and the blocks from block number M to (N-1) are allocated to form the namespace set S(0, 0, 1).

In the same tier, the different namespace sets do not share any blocks, and the I/O isolation between the different namespace sets is good. The access to the different namespace sets in the same tier do not interfere each other, which results in perfect data isolation.

In an exemplary embodiment, the LUN-based namespace set allocation can ideally provide I/O isolation among tenants. As for the I/O isolation between applications owned by one tenant, block-based namespace set allocation is a good choice.

In an exemplary embodiment, the LUN-based namespace set allocation is performed to divide a storage device to correspond to the different virtual machines.

In an exemplary embodiment, the block-based namespace set allocation is performed to further divide the storage space of a virtual machine, to correspond to the different applications run for the virtual machine.

Figure 7:
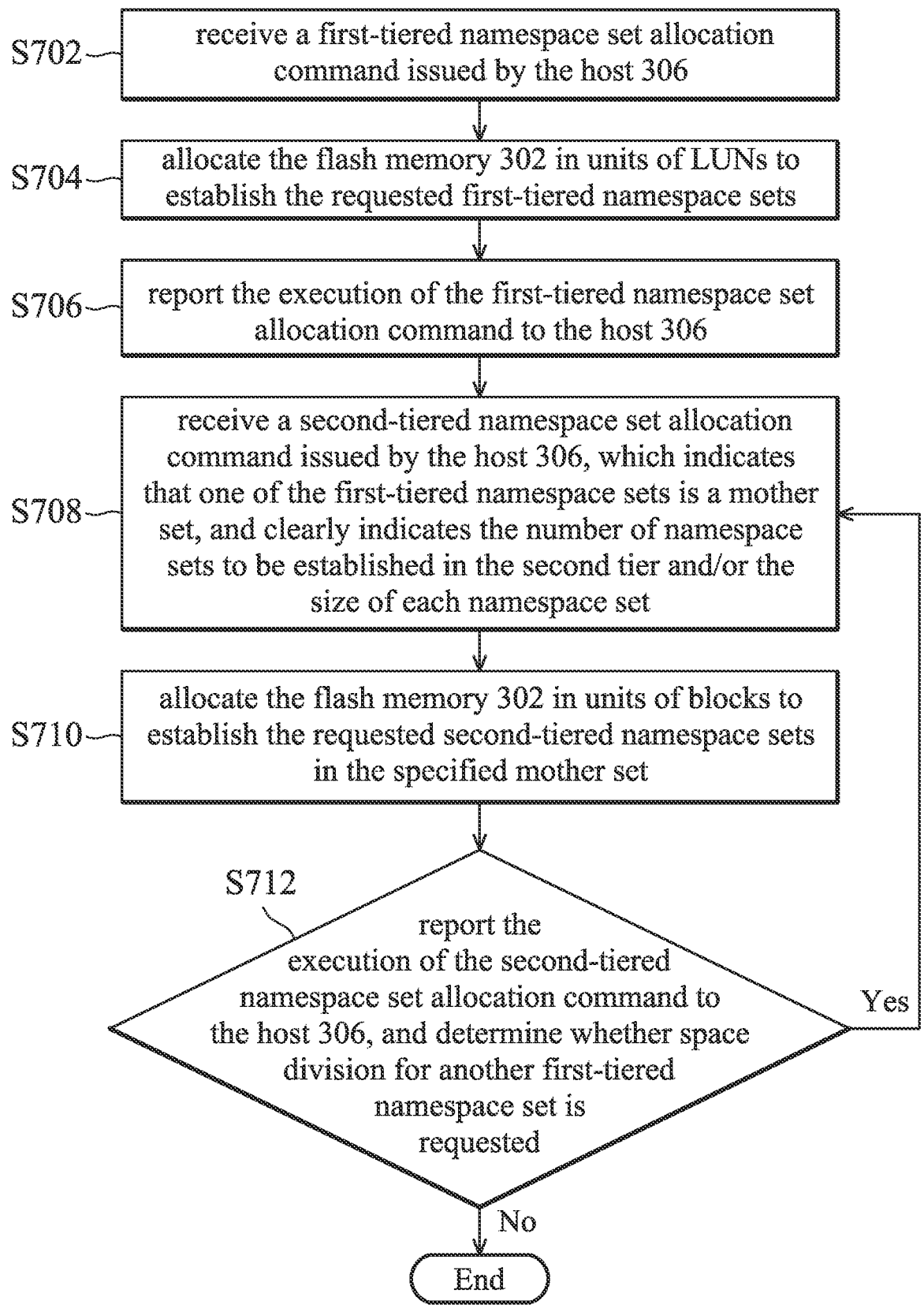
FIG. 7 is a flowchart illustrating namespace set allocation in accordance with an exemplary embodiment of the present invention.

FIG. 7 is a flowchart illustrating namespace set allocation in accordance with an exemplary embodiment of the present invention.

In step S702, the controller 304 receives a first-tiered namespace set allocation command issued by the host 306, which indicates the number of namespace sets to be built in the first tier, and/or the size of each namespace set.

In step S704, the controller 304 operates according to the first-tiered namespace set allocation command to establish the requested first-tiered namespace sets by allocating the flash memory 302 in units of LUNs (i.e., LUN-based namespace set allocation).

In step S706, the controller 304 reports the execution of the first-tiered namespace set allocation command to the host 306.

In step S708, the controller 304 receives a second-tiered namespace set allocation command issued by the host 306, which indicates that one of the first-tiered namespace sets is a mother set, and clearly indicates the number of namespace sets to be established in the second tier and/or the size of each namespace set.

In step S710, the controller 304 operates according to the second-tiered namespace set allocation command to establish the requested second-tiered namespace sets in the specified mother set by allocating the flash memory 302 in units of blocks (i.e., block-based namespace set allocation).

In step S712, the controller 304 reports the execution of the second-tiered namespace set allocation command to the host 306, and determines whether space division for another first-tiered namespace set is requested. If no, the procedure ends. If yes, step S708 is performed again.

Figure 8:
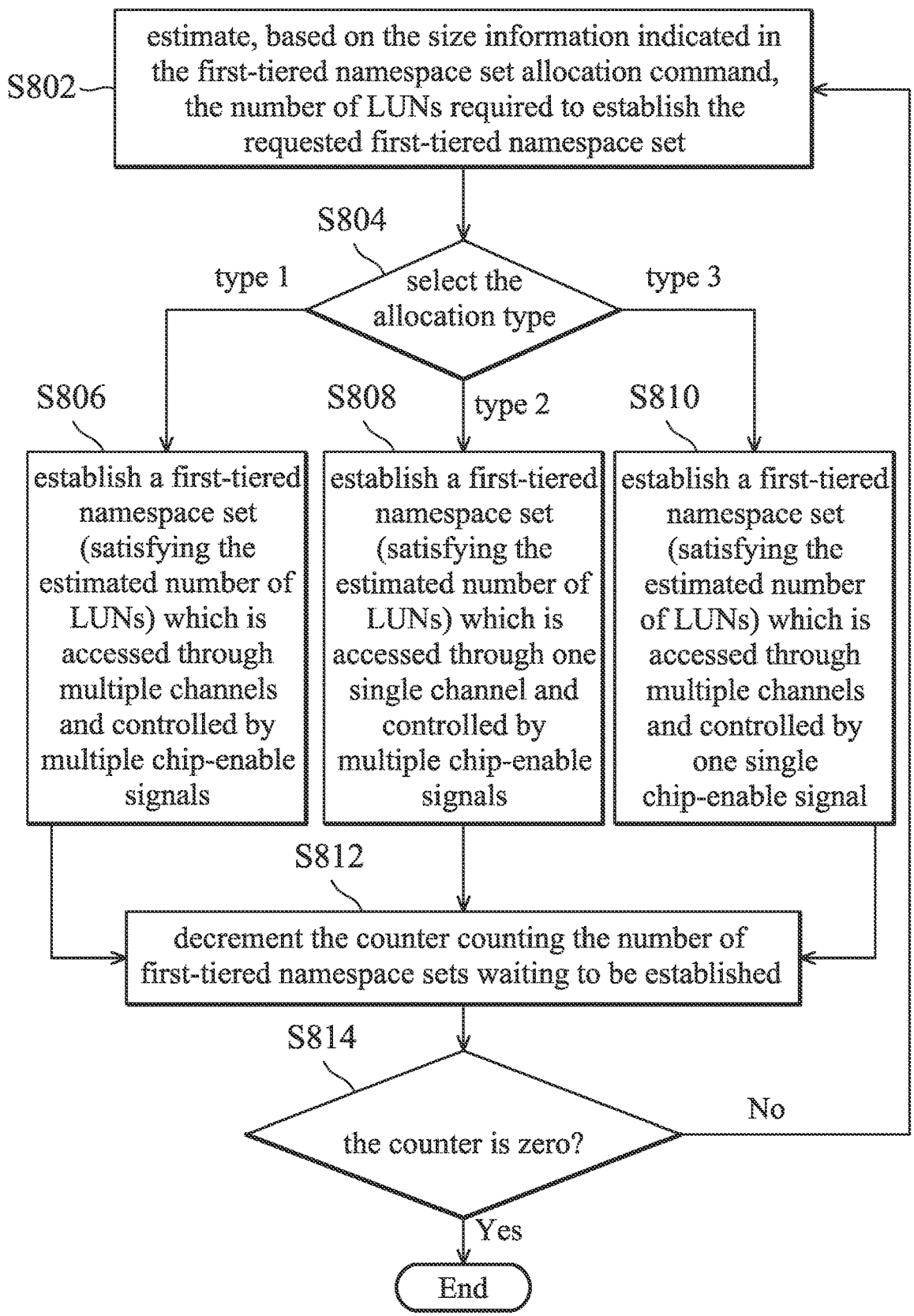
FIG. 8 is a flowchart depicting the details of step S704 in accordance with an exemplary embodiment of the present invention, which completes the allocation of the first-tiered namespace sets.

FIG. 8 is a flowchart depicting the details of step S704 in accordance with an exemplary embodiment of the present invention, which completes the allocation of the first-tiered namespace sets.

In step S802, the controller 304 estimates, based on the size information indicated in the first-tiered namespace set allocation command, the number of LUNs required to establish the requested first-tiered namespace set.

In step S804, the controller 304 selects the allocation type. When type 1 is selected, the procedure proceeds to step S806. When type 2 is selected, the procedure proceeds to step S808. When type 3 is selected, the procedure proceeds to step S810.

In step S806, the controller 304 establishes a first-tiered namespace set which is accessed through multiple channels and controlled by multiple chip-enable signals as FIG. 4A. The established first-tiered namespace set satisfies the estimated number of LUNs.

In step S808, the controller 304 establishes a first-tiered namespace set which is accessed through one single channel and controlled by multiple chip-enable signals as FIG. 4B. The established first-tiered namespace set satisfies the estimated number of LUNs.

In step S810, the controller 304 establishes a first-tiered namespace set which is accessed through multiple channels and controlled by one single chip-enable signal as FIG. 4C. The established first-tiered namespace set satisfies the estimated number of LUNs.

In step S812, the controller 304 decrements the counter counting the number of first-tiered namespace sets waiting to be established.

In step S814, the controller 304 determines whether the counter is zero. If yes, the all first-tiered namespace sets requested in the first-tiered namespace set allocation command are all established. This procedure ends. If not, the procedure performs step S802 again.

Figure 9:
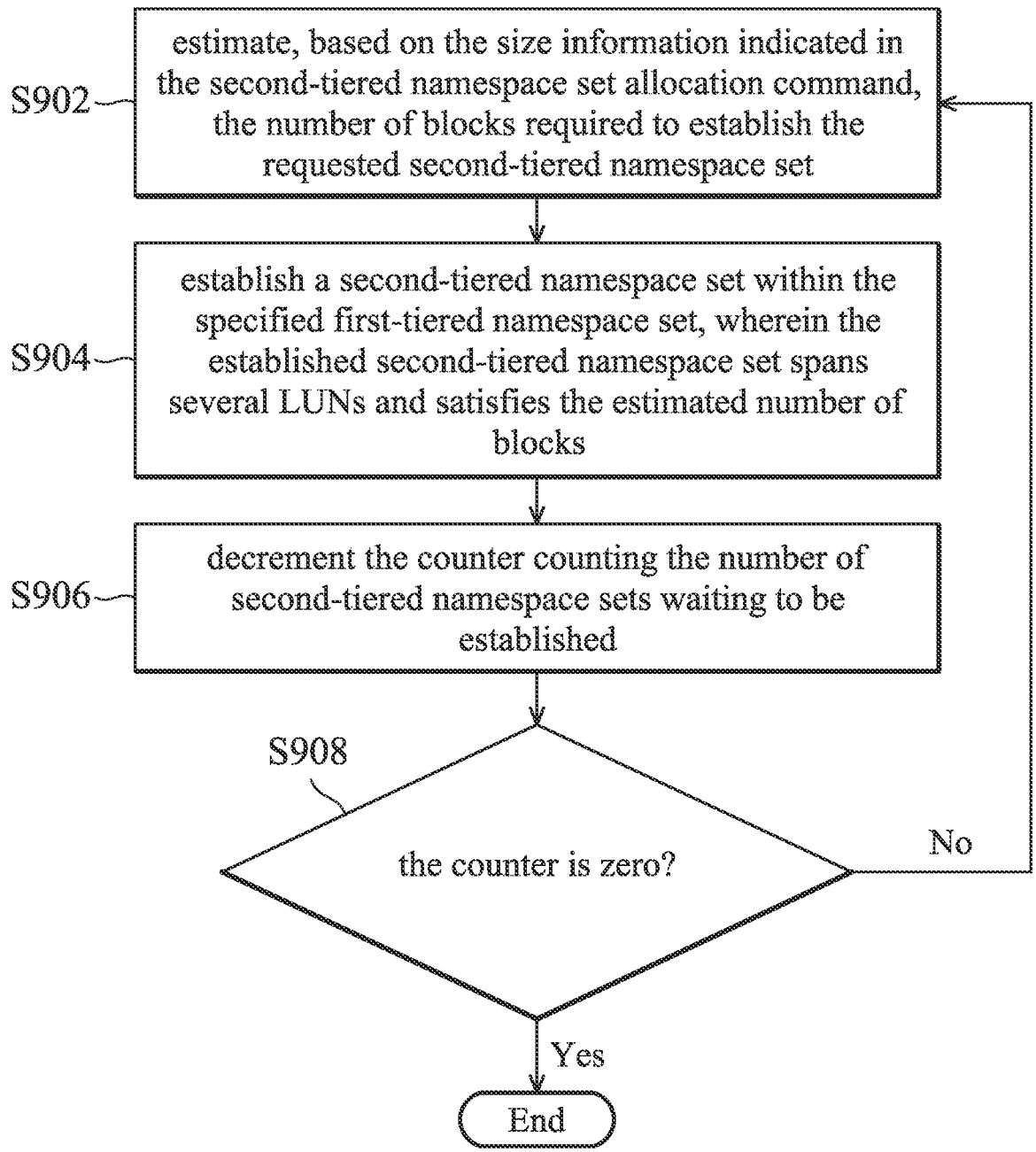
FIG. 9 is a flowchart illustrating the details of step S710 in accordance with an exemplary embodiment of the present invention, by which a specified first-tiered namespace set is further divided into several second-tiered namespace sets.

FIG. 9 is a flowchart illustrating the details of step S710 in accordance with an exemplary embodiment of the present invention, by which a specified first-tiered namespace set is further divided into several second-tiered namespace sets.

In step S902, the controller 304 estimates, based on the size information indicated in the second-tiered namespace set allocation command, the number of blocks required to establish the requested second-tiered namespace set.

In step S904, the controller 304 establishes a second-tiered namespace set within the specified first-tiered namespace set. The established second-tiered namespace set spans several LUNs as FIG. 5A, 5B or 5C, and satisfies the estimated number of blocks.

In step S906, the controller 304 decrements the counter counting the number of second-tiered namespace sets waiting to be established.

In step S908, the controller 304 determines whether the counter is zero. If yes, the all second-tiered namespace sets requested in the second-tiered namespace set allocation command are all established. This procedure ends. If not, the procedure repeats step S902.

The controller 304 operates the flash memory 302 may be implemented by other structures.

Any hierarchical storage space allocation of non-volatile memory based on the aforementioned concept falls within the scope of the present invention. The aforementioned concept may be used to realize non-volatile memory control methods.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, coupled to the non-volatile memory and configured to control the non-volatile memory,
wherein:
the controller establishes a first namespace set by allocating the non-volatile memory in units of a first storage unit, and establishes a second namespace set by allocating the non-volatile memory in units of a second storage unit;
the first storage unit is bigger than the second storage unit, and the first storage unit has better input and output isolation than the second storage unit;
the first namespace set is in a first tier in a hierarchical storage architecture, and the second namespace set is in a second tier in the hierarchical storage architecture;
the non-volatile memory is a flash memory;
the controller accesses the flash memory though a plurality of channels and controls a plurality of chip-enable signals to alternately enable rows of storage areas for parallel access through the plurality of channels;
storage areas accessed through the same channel but enabled by the different chip-enable signals are distinguished from each other by logical unit numbers;
each logical unit number manages a plurality of blocks;
each storage area managed by a logical unit number is a first storage unit; and
each block is a second storage unit.

2. The data storage device as claimed in claim 1, wherein:
the controller establishes a third namespace set by allocating the non-volatile memory in units of the first storage unit without overlapping the first namespace set;
the controller establishes the second namespace set within the first namespace set; and
within the first namespace set, the controller establishes a fourth namespace set by allocating the non-volatile memory in units of the second storage unit without overlapping the second namespace set.

3. The data storage device as claimed in claim 2, wherein:
the controller permits a first application program run for the first namespace set to access the second namespace set and the fourth namespace set;
the controller forbids the first application program to access the third namespace set.

4. The data storage device as claimed in claim 3, wherein:
the controller forbids a second application program run for the second namespace set to access the fourth namespace set.

5. The data storage device as claimed in claim 4, wherein:
the controller further establishes a fifth namespace set and a sixth namespace set within the second namespace set by allocating the non-volatile memory in units of the second storage unit, wherein the fifth namespace set and the sixth namespace set are in a third tier in the hierarchical storage architecture; and
the fifth namespace set does not overlap the sixth namespace set.

6. The data storage device as claimed in claim 5, wherein:
the controller permits the second application program to access the fifth namespace set and the sixth namespace set.

7. The data storage device as claimed in claim 2, wherein:
the first namespace set and the third namespace set are accessed through the different channels.

8. The data storage device as claimed in claim 7, wherein:
each storage area managed by logical unit numbers assigned to the first namespace set is partially assigned to the second namespace set and partially assigned to the fourth namespace set.

9. The data storage device as claimed in claim 2, wherein:
the first namespace set and the third namespace set are controlled by the different chip-enable signals.

10. The data storage device as claimed in claim 9, wherein:
each storage area managed by logical unit numbers assigned to the first namespace set is partially assigned to the second namespace set and partially assigned to the fourth namespace set.

11. A non-volatile memory control method, comprising:
establishing a first namespace set by allocating a non-volatile memory in units of a first storage unit, and establishing a second namespace set by allocating the non-volatile memory in units of a second storage unit;
providing a flash memory as the non-volatile memory; and
accessing the flash memory though a plurality of channels, and controlling a plurality of chip-enable signals to alternately enable rows of storage areas for parallel access through the plurality of channels;
wherein:
the first storage unit is bigger than the second storage unit, and the first storage unit has better input and output isolation than the second storage unit;
the first namespace set is in a first tier in a hierarchical storage architecture, and the second namespace set is in a second tier in the hierarchical storage architecture;
storage areas accessed through the same channel but enabled by the different chip-enable signals are distinguished from each other by logical unit numbers;
each logical unit number manages a plurality of blocks;
each storage area managed by a logical unit number is a first storage unit; and
each block is a second storage unit.

12. The non-volatile memory control method as claimed in claim 11, further comprising:
establishing a third namespace set by allocating the non-volatile memory in units of the first storage unit without overlapping the first namespace set;
establishing the second namespace set within the first namespace set; and
within the first namespace set, establishing a fourth namespace set by allocating the non-volatile memory in units of the second storage unit without overlapping the second namespace set.

13. The non-volatile memory control method as claimed in claim 12, further comprising:
permitting a first application program run for the first namespace set to access the second namespace set and the fourth namespace set; and forbidding the first application program to access the third namespace set.

14. The non-volatile memory control method as claimed in claim 13, further comprising:
    forbidding a second application program run for the second namespace set to access the fourth namespace set.

15. The non-volatile memory control method as claimed in claim 14, further comprising:
    establishing a fifth namespace set and a sixth namespace set within the second namespace set by allocating the non-volatile memory in units of the second storage unit, wherein the fifth namespace set and the sixth namespace set are in a third tier in the hierarchical storage architecture,
    wherein the fifth namespace set does not overlap the sixth namespace set.

16. The non-volatile memory control method as claimed in claim 15, further comprising:
    permitting the second application program to access the fifth namespace set and the sixth namespace set.

17. The non-volatile memory control method as claimed in claim 12, wherein:
    the first namespace set and the third namespace set are accessed through the different channels.

18. The non-volatile memory control method as claimed in claim 17, wherein:
    each storage area managed by logical unit numbers assigned to the first namespace set is partially assigned to the second namespace set and partially assigned to the fourth namespace set.

19. The non-volatile memory control method as claimed in claim 12, wherein:
    the first namespace set and the third namespace set are controlled by the different chip-enable signals.

20. The non-volatile memory control method as claimed in claim 19, wherein:
    each storage area managed by logical unit numbers assigned to the first namespace set is partially assigned to the second namespace set and partially assigned to the fourth namespace set.

* * * * *